United States Patent [19]

Bailey et al.

[11] 4,234,326
[45] Nov. 18, 1980

[54] FILTER ASSEMBLIES WITH LAYERS OF ACTIVATED CARBON FIBROUS CLOTH

[75] Inventors: Alan Bailey; Frederick A. P. Maggs, both of Salisbury, England

[73] Assignee: The Secretary of State for Defence in Her Britannic Majesty's Government of the United Kingdom of Great Britain and Northern Ireland, London, England

[21] Appl. No.: 928,145

[22] Filed: Jul. 26, 1978

Related U.S. Application Data

[63] Continuation of Ser. No. 539,105, Jan. 7, 1975, abandoned, which is a continuation of Ser. No. 376,159, Jul. 3, 1973, abandoned.

[30] Foreign Application Priority Data

Jul. 5, 1972 [GB] United Kingdom ............... 31475/72

[51] Int. Cl.[2] ...................... B01D 46/60; B01D 39/04
[52] U.S. Cl. ....................................... 55/278; 55/387; 55/521; 252/422
[58] Field of Search ................. 55/278, 316, 378, 387, 55/500, 521, 527, DIG. 28; 252/422, 447, 477 R; 425/447

[56] References Cited

U.S. PATENT DOCUMENTS

| 1,934,023 | 11/1933 | Wright | 252/477 R |
|---|---|---|---|
| 2,038,071 | 4/1936 | Wilhelm | 55/388 |
| 2,526,657 | 10/1950 | Guyer | 252/477 R |
| 2,973,828 | 3/1961 | Engle | 55/278 |
| 3,053,775 | 9/1962 | Abbott | 252/421 |
| 3,466,151 | 9/1969 | Sicard et al. | 252/477 R |
| 3,487,610 | 1/1970 | Brown et al. | 55/278 |
| 3,757,499 | 9/1973 | Scott | 55/521 |
| 3,769,144 | 10/1973 | Economy et al. | 423/447 |
| 3,847,833 | 11/1974 | Bailey et al. | 252/447 |
| 3,849,332 | 11/1974 | Bailey et al. | 252/422 |

FOREIGN PATENT DOCUMENTS

| 393022 | 12/1908 | France | 55/DIG. 28 |
|---|---|---|---|
| 514500 | 12/1971 | Switzerland | 423/447 |
| 292479 | 6/1929 | United Kingdom | 55/DIG. 39 |
| 632360 | 11/1949 | United Kingdom | 55/278 |

Primary Examiner—P. E. Konopka
Attorney, Agent, or Firm—Stevens, Davis, Miller & Mosher

[57] ABSTRACT

A gas adsorption filter consisting of a gas inlet, a gas outlet and one or more layers of charcoal cloth, the layers of which are arranged to lie substantially parallel to the direction of the gas flow between the gas inlet and the gas outlet.

8 Claims, 8 Drawing Figures

FILTER ASSEMBLIES WITH LAYERS OF ACTIVATED CARBON FIBROUS CLOTH

This is a continuation of application Ser. No. 539,105 filed Jan. 7, 1975 which in turn is a continuation of application Ser. No. 376,159 filed July 3, 1973, both now abandoned.

The invention relates to gas adsorptive filters for example for use in respirators, wherein the filtering material is composed at least partially of activated carbon cloth hereinafter referred to as charcoal cloth. The term adsorption as used herein includes absorption.

British Pat. No. 1,301,101 described a process for the production of highly activated flexible carbon cloth suitable for use in place of granular active carbon in gas adsorption filters for use on personal respirators or for filtering air supplies to buildings, vehicles etc. Filters constructed from such cloth are advantageous in that they offer less resistance to gas flow than do filters comprising a bed of granules having similar gas adsorptive capacity. In addition the cloth has no tendency to pack down or suffer attrition under vibration, a condition frequently leading to leakage in granular beds; and is easier to replace or regenerate than a corresponding granular filter.

In constructing gas adsorptive filters it is generally desirable to combine maximum adsorptive capacity with minimum gas flow resistance and, especially in portable respirators, minimum overall dimensions and weight.

Filters may readily be produced using charcoal cloth as an adsorptive medium in a perpendicular flow arrangement wherein the layers of cloth are aligned substantially perpendicularly to the direction of gas flow through the layers of cloth. However it has been found that charcoal cloth filters having advantageously high adsorptive capacity and low gas flow resistance for a given maximum overall dimension may be constructed by arranging the gas flow to be substantially parallel, rather than perpendicular, to the plane of the charcoal cloth so that the gas flows along or alongside rather than through the layers of cloth.

According to the present invention, a gas adsorption filter comprising layers of charcoal cloth is arranged so that the predominant effective direction of gas flow through the filter is substantially parallel to the surface of the charcoal cloth.

Thus according to the invention a filter comprises a container having a gas inlet, a gas outlet and one or more layers of charcoal cloth, the layers of charcoal cloth being arranged to lie substantially parallel to the direction of gas flow between the gas inlet and the gas outlet.

It has surprisingly been found that virtually complete removal of adsorbable gas or vapour impurities from a gas stream may be achieved by passing the gas between layers of charcoal cloth separated by up to 2 mm and that partial removal may be achieved at even larger separations of 1 cm or more provided the residence time (linear gas flow rate divided by the minimum path length over the cloth) is sufficient to allow diffusion of gas molecules from all parts of the gas stream to the surface of the charcoal cloth. However, to ensure maximum efficiency of removal the separation of the layers should preferably be between about 0.1 and 1 mm, 0.5 mm being especially convenient.

The layers of charcoal cloth may be held apart by rigid fixing at their edges or by internal separators. However especially when the inter-layer spacing is small for example less than about 2 mm, the layers of cloth are preferably held apart by spacing layers of air permeable material such as glass fibre or wood fibre or an open-celled foam, for example a polyurethane foam, having large inter-communicating pores. Such an air permeable material will also act as a particulate filter, an especially convenient combined gas and particulate filter being obtained by using open-celled foam incorporating glass fibre as the spacing layer.

Parallel-flow filters constructed in accordance with the invention show reduced gas flow resistance with no reduction in adsorptive capacity when compared with perpendicular-flow filters using similar dimensions of charcoal coth. It should be noted, however, that parallel-flow filters have the unusual and valuable attribute that increasing filter capacity by adding additional layers of cloth reduces the gas flow resistance whereas adding additional layers to perpendicular flow filters greatly increases the gas flow resistance. Increased capacity with decreased flow resistance in perpendicular-flow filters may only be achieved by using a larger area of cloth in each layer, resulting in difficulties in supporting the cloth and in increased and generally unwieldy overall dimensions.

The construction of the parallel-flow filter may be of various forms but preferably consists of alternate layers of charcoal cloth and air permeable spacing material having seals on selected surfaces to ensure that the gas stream to be filtered flows over the surface of the charcoal cloth. It should be noted, however, that parallel-flow filters do not require gas-tight seals between the layers of charcoal cloth and the container or between successive layers of cloth (in perpendicular-flow filters edge sealing to the container is essential). Thus the construction of parallel-flow filters and replacement of spent filters may be simplified involving only insertion of a filter stack into a suitably dimensioned tight fitting box equipped with suitable air inlet and outlet.

A particularly convenient type of filter in accordance with the present invention comprises a stack of alternate annular sheets of charcoal cloth and open celled foam each having similar internal and external radius, held between a circular top and bottom non air-permeable plates, the top plate bearing a duct communicating with the centre of the stack.

It is found that sealing together alternate layers of cloth at each end of a stack so that a series of air channels each closed at one end and open at the other are formed between the layers of cloth does not significantly increase the gas flow resistance. Similarly a filter in accordance with the present invention may be formed by folding a length of charcoal cloth backwards and forwards around layers of spacing material. However it will be readily appreciated that in this type of filter the seal between alternate layers need not, necessarily, be gas-tight. Alternatively, the layers of cloth may be formed by a single rolled sheet.

The charcoal cloth may be any carbon cloth capable of adsorbing gas molecules, but is preferably highly-activated carbon cloth produced as fully described in British Pat. No. 1,301,101.

As described therein, a process for the production of a strong, flexible (as herein defined), activated fibrous carbon comprises incorporating into a fibrous carbohydrate material from a solution (as herein defined) at least one Lewis acid which is a halide of zinc, aluminum, calcium, magnesium or iron, drying the fibrous carbohydrate material and flexing the material sufficiently to restore the major proportion of any flexibility lost by contact with the Lewis acid solution, carbonizing the material by heating to carbonizing temperature in an inert atmosphere, and activating the carbonized material by contact at an elevated temperature with an activating gas until the activate has a carbon tetrachloride sorbency of at least 50% by weight.

In the above definition the term "flexible" as applied to an activated fibrous carbon is used to denote a a fibre or fabric which is sufficiently deformable to fold back upon itself without fracture around a radius of curvature of 0.5 millimeter; and the term highly activated is used to denote an active fibrous carbon which can sorb at least 50% of its own weight of carbon tetrachloride. The term "strong" as applied to fibrous carbon is not susceptible of precise definition because of the wide variations in strength attainable with fibrous active carbons produced from different fibrous carbohydrate starting materials. Thus, for example, an active fibrous carbon obtained from a naturally occurring fibrous cellulose such as cotton is inherently much weaker than an active fibrous carbon obtained from a regenerated cellulose fibre such as viscose rayon. The term "strong" is therefore used generally to indicate fibre strengths in the higher regions of the attainable strength range, but for viscose rayon and cuprammonium rayon derived fibrous carbons can be more closely defined as a breaking strength of at least 30,000 pounds per square inch.

The presence of the Lewis acid in the carbonization process may be ensured by incorporating the Lewis acid in the material to be carbonized at any stage prior to complete carbonization, but it is preferable generally to incorporate Lewis acids before any carbonization of the starting material has taken place. Incorporation of Lewis acids is conveniently achieved by immersing the starting material in a solution (which terms includes a dispersion) of the Lewis acid impregnated therein. Alternatively, the Lewis acid may be incorporated in a precursor of the starting material. For example a Lewis acid may be admixed with a solution of viscose before the latter is extruded to form filaments or rayon in a precipitating bath.

The preferred method of incorporation is by soaking the fibrous carbohydrate material in a solution of the Lewis acid, but considerable care should be taken to optimize the conditions under which contact with the Lewis acid occurs. Thus it is found that a brief or lengthy contact time—that is the time for which the carbohydrate material is wet with Lewis acid solution—will generally result in good yields of strong carbonized fibrous material, but intermediate contact times can give considerably weaker carbonized material. A similar strength variation may be observed to accompany variations in drying temperature, temperatures of around 50° C. for example usually yielding much weaker carbonized material than temperatures around room temperature or above 100° C. This variable behavior varies further between different fibrous carbohydrate starting materials and it is generally advisable to carry out a few preliminary tests to ascertain the optimum treatment for a particular starting material.

Where the Lewis acid is incorporated from solution, the solution should normally have a concentration of between 1 and 30% by weight of the Lewis acid and preferably 2–10% by weight. As a rough guide in this preferred range, the amount of Lewis acid actually incorporated in the cloth approximates to the concentration in the solution, i.e. a 5% solution of zinc chloride incorporated about 4% by weight of Lewis acid into a typical cellulose rayon fibre. The temperature and concentration of the Lewis acid solution are both kept as low as consistent with a useful level of incorporation for a reasonable contact time. For some coated fibrous carbohydrates, however, such as viscose rayon cloths coated with urea-formaldehyde resin to give crease-resistance, it may be necessary to use concentrations at the upper end of the range and temperatures of up to about 100° C. to achieve adequate incorporation of Lewis acid.

When a fibrous carbohydrate is dried after contact with the Lewis acid solution it is generally found that adjacent fibres have weakly adhered to one another possibly due to the formation of a "gel" type of structure on the fibre surface during contact with the Lewis acid solution. The resulting stiffness in the treated carbohydrate must be largely removed by flexing the dried material if good flexibility is to be obtained in the activated fibrous carbon finally produced. Flexing may be adequately achieved by manual working to restore suppleness or by a variety of mechanical treatments in which the material is flexed. A useful technique is to draw the fibrous material around a smooth surfaced edge so that its direction changes fairly sharply and an appropriate restoration of flexibility is achieved.

Carbonization of fibrous carbohydrates incorporating Lewis acid is carried out by heating in an inert atmosphere, i.e. in vacuum or an atmosphere consisting substantially of any unreactive or inert gas or mixture of any of these gases such as nitrogen, carbon dioxide, helium or argon.

It was found that when Lewis acids are used in carbonizing processes in accordance with the present invention, there is, within the broad temperature range of 70°–300° C., a critical temperature range of between 40° and 80° C. depending upon the Lewis acid used, within which the temperature should be maintained for at least 15 and preferably 20 minutes for a 40° C. range, and increasing progressively to at least 30 minutes for a 80° C. range, in order to produce fibrous carbon having relatively high tensile strength without loss of other valuable properties. It has been found particularly advantageous for the material to be held at a constant temperature within the critical range for a period between 15 minutes and 1 hour, particularly as a pause period within an otherwise steadily rising temperature programme.

The critical temperature range is around the temperature at which the material starts to decompose and loses weight most rapidly during the carbonizing process.

The rate of heating up to the critical temperature range is preferably slow and for best results the rate should not exceed 10° C. rise per minute.

Activation of the carbonized fibre (char) is achieved by heating the char at an elevated temperature in the presence of a stream of activating gas until the desired porosity (activity) is achieved. Activation temperatures are between 600° C. and 1000° C. and generally between 700° C. and 900° C. and the activating gas is preferably steam or carbon dioxide.

Examples of filters constructed from charcoal cloth to conventional designs or in accordance with the present invention will now be described with reference to the accompanying drawing in which FIGS. 1a, 1b, 1c represent diagramatically filters constructed from charcoal cloth wherein the gas flow is perpendicular to the plane of the cloth.

Figure 1A:
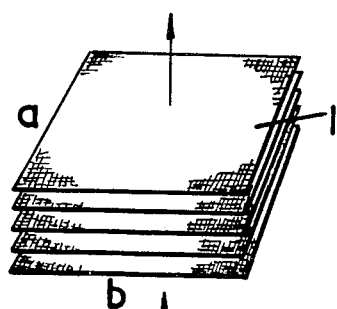

Referring to FIG. 1a, air is passed perpendicularly through a number of rectangular sheets 1 of charcoal cloth, having linear dimensions a and b as shown, arranged in a stack.

Figure 1B:
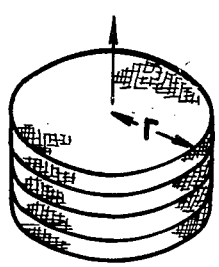

FIG. 1b shows a similar stack of round sheets of radius r used in the perpendicular flow arrangement.

Figure 1C:
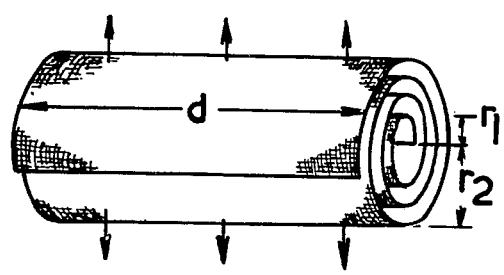

FIG. 1c represents a filter constructed from a sheet of charcoal cloth of length 1 and width d formed into a roll having an internal radius r, an external radius $r_2$ and a length d. With this type of filter the gas flows along the centre cavity and then out through the layers of charcoal cloth in a direction perpendicular to the cloth.

Figure 2A:
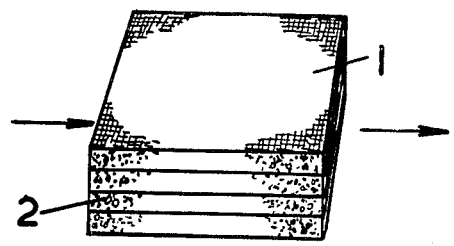
FIGS. 2a, 2b, 2c represent diagramatically filters constructed from similar sheets of charcoal cloth, but wherein, in accordance with the present invention, the gas flow is parallel to the plane of the cloth.
Figure 2B:
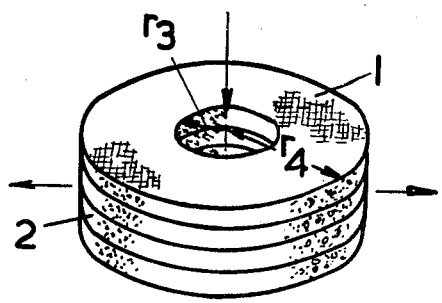
Figure 2C:
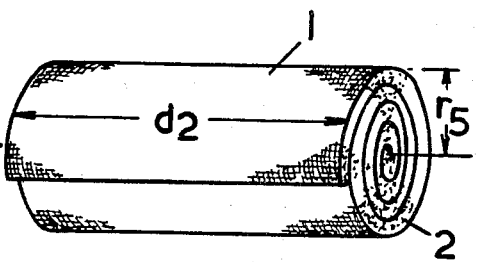

FIGS. 2a, 2b and 2c show similar systems arranged so that the gas flow is, in accordance with the present invention, parallel to the plane of the charcoal cloth adjacent to the gas.

Thus in FIG. 2a the gas flows between the sheets 1 of charcoal cloth which are held apart by layers 2 of open celled foam. In FIG. 2b the filter is composed of annular sheets of cloth 1 and of foam 2 of internal radius $F_3$ and external radius $r_4$ and the gas flow is from the centre to the outside. In FIG. 2c a sheet of charcoal cloth 1 having a length 1 and a similar sheet of foam 2 are formed into a roll having a radius $r_5$ and a length $d_2$ is used and gas is passed through the roll from one end to the other.

Figure 3:
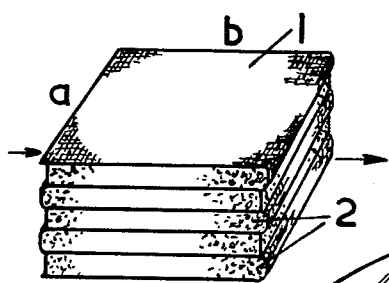
FIG. 3 represents diagramatically a filter of similar construction to that shown in FIG. 2a, but formed from a single sheet of charcoal cloth folded backwards and forwards over a number of sheets of spacing material.

FIG. 3 shows a similar arrangement to FIG. 2a wherein the layers of charcoal cloth 1 are formed by a single sheet of charcoal cloth of width a and length nb folded around n-1 layers of open celled foam 2 to form a filter through which gas is flowed in the direction indicated by the arrows.

In this design the single sheet may be replaced by up to 10 adjacent layers of charcoal cloth with only about 10% increase in resistance.

As will be evident from examples given hereafter the flow resistance of a filter is very dependent on the actual dimensions irrespective of design. To afford a basis of comparison, the effect of the type of flow on the design of a respirator of practical dimension must be considered.

Table I shows by way of example the calculated gas flow resistances for filters as shown in FIG. 1b (prior art) and FIG. 2b (present invention) employing 2000 cm³ of charcoal cloth and having a maximum diameter of 10 cm when used at a gas flow rate of 85 liters/min.

The measured resistance of a particular charcoal cloth produced by a process as described in British Pat. No. 1,301,101 has been used in the calculation, together with the measured resistance of an open-celled polyurethane foam (having a thickness in the filter of 0.7 mm) in calculating the resistance of parallel flow filters

TABLE I

| Design as in FIG. | Dimensions cm. | | Flow Resistance cm. H$_2$O |
|---|---|---|---|
| 1b | r = 5 | | n = 25  6.3 |
| 1b | 4 | | 40  22.0 |
| 1b (2 in parallel) | 5 | | 12  1.3 |
| 2b | $r_1$ = 5 | $r_2$ = 1 | 0.86 |
| 2b | 4 | 2 | 0.46 |
| 2b (2 in parallel) | 4 | 1 | 0.46 |

The low air flow resistance given by filters in accordance with the present invention is apparent, only two 10 cm diameter discs giving comparable results when used in the perpendicular flow arrangement. Similar advantage may be calculated for designs suited to large filtration units.

In addition the designs in accordance with the present invention have advantages in ease of construction. For example in Type 2a the filter is merely pushed into an open-ended rectangular box; Type 2b is held tightly between 2 discs (see FIG. 4); and the roll of FIG. 2c is fitted tightly into a cylindrical container which may form part of an air supply duct.

Figure 4:
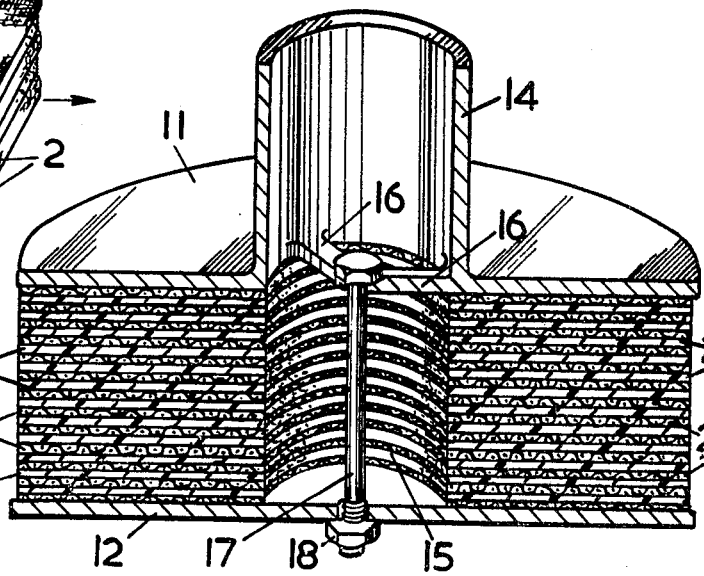
FIG. 4 shows a section through a complete filter constructed on the same design as FIG. 2b.

Referring to FIG. 4, the filter comprises a circular metal top plate 11, a circular metal bottom plate 12 and an annular filter element 13. The top plate 11 carries a pipe 14 which communicates through an aperture in the top plate with the central hole 15 in the annular filter element. Radial struts 16 extend inwardly from the pipe 14 and support a bolt 17 which passes through the bottom plate 12. A nut 18 on the outside of the bottom plate holds the assembly together and applies slight compression to the filter element 13. The filter element 13 comprises alternate layers of charcoal cloth 20 and open-celled polyurethane foam 21.

In use, the gas supply to be filtered may be fed to the filter through the pipe 14, and allowed to escape via the filter element 13 to the surrounding atmosphere. Alternatively, filtered gas may be withdrawn through the pipe 14 causing gas to be drawn into the filter from a contaminated environment.

The effect on the penetration time of varying thicknesses of foam separating charcoal cloth discs in a parallel flow disc filter was measured.

Two discs (19 cm diameter) of Perspex (Trade Mark) were held parallel and concentric by three threaded bolts, so that the distance between the plates could be varied. One disc carried a 2.3 cm diameter glass tube perpendicular at the centre of the disc, through which a matching hole had been drilled. The charcoal cloth and foam annuli were compressed centrally between the Perspex (Trade Mark) plates (n annuli of cloth, (n-1) annuli of foam). The radii of the disc annuli were: $r_2$=5 cm; $r_1$=1 cm; area 75 cm². The charcoal cloth had a density 12 mg/cm² and the polyurethane foam was 20 pores per inch, ⅛ inch thick and 10 mg per cm².

The charcoal cloth annuli were stored for several days in an atmosphere at 80 percent relative humidity and the test air was also at this humidity.

The test agent, chlorobenzene, was injected with the air stream to give a concentration of 10 mg/l. A calibrated halogen detector sampled the effluent air and the penetration times were recorded at an effluent concentration of 10 g/l.

An arbitrary flow rate of 0.83 l/min per disc of charcoal cloth was chosen.

The results are given in Table II

TABLE II

| Number of layers | Total flow rate, l/min. | Total thickness of filter, mm | Foam Thickness per disc, mm | Penetration time, min |
|---|---|---|---|---|
| 6 | 5 | 4.8 | 0.36 | 52 |
| 9 | 7.5 | 7.4 | 0.36 | 49 |
| 12 | 10 | 10 | 0.33 | 50 |
| 6 | 5 | 9.4 | 1.3 | 29 |
| 6 | 5 | 7.5 | 0.9 | 41 |
| 12 | 10 | 12 | 0.55 | 49 |
| 12 | 10 | 10. | 0.33 | 50 |
| 12 | 10 | 8 | 0.17 | 49 |

The maximum penetration times corresponded to an uptake of 46 percent (w/w) chlorobenzene.

What we claim is:

1. A gas adsorption filter comprising
   (a) a gas inlet,
   (b) a gas outlet, and
   (c) a plurality of layers of charcoal cloth composed of activated fibrous carbon, the layers of charcoal cloth being arranged to lie in and substantially parallel to the direction of gas flow between the gas inlet and the gas outlet and being separated from each other by layers of an air permeable material selected from the group consisting of glass fiber, wood fiber, and open celled foam.

2. A gas adsorption filter according to claim 1 wherein the layers of charcoal cloth are separated one from the other by distances up to about 1 cm.

3. A gas adsorption filter according to claim 2 wherein the layers of charcoal cloth are separated one from the other by distances in the range about 0.1 mm to 1.0 mm.

4. A gas adsorption filter according to claim 1 comprising a stack of alternate annular sheets of charcoal cloth and open-celled foam, each having similar internal and external radius, held between a circular top and bottom non air-permeable plate, the top plate bearing a duct communicating with the centre of the stack.

5. A gas adsorption filter according to claim 1 wherein successive layers of charcoal cloth are sealed together at alternate ends of a stack to form between the cloth layers a series of air permeable channels each closed at one end and open at the other end.

6. A gas adsorption filter according to claim 1 wherein a single sheet of charcoal cloth is folded backwards and forwards around successive layers of air permeable material to form said layers of charcoal cloth.

7. A gas adsorption filter according to claim 1 wherein the air permeable material is an open-celled polyurethane foam.

8. A gas adsorption filter according to claim 1 wherein the charcoal cloth is a cloth of a strong flexible fibrous carbon made by incorporating into a fibrous carbohydrate material from a solution at least one Lewis acid which is a halide of zinc, aluminum, calcium, magnesium, or iron; drying the fibrous carbohydrate material and flexing the material sufficiently to restore the major proportion of any flexibility lost by contact with the Lewis acid solution; carbonizing the material by heating to carbonizing temperature in an inert atmosphere; and activating the carbonized material by contact at an elevated temperature with an activating gas until the activate has a carbon tetrachloride sorbency of at least 50% by weight.

* * * * *